(12) United States Patent
Robison et al.

(10) Patent No.: US 12,480,860 B2
(45) Date of Patent: Nov. 25, 2025

(54) IN-SITU CORROSION MONITORING DEVICE AND METHODS OF USE THEREOF

(71) Applicant: ABILENE CHRISTIAN UNIVERSITY, Abilene, TX (US)

(72) Inventors: Jordan Robison, Abilene, TX (US); Aaron Robison, Abilene, TX (US); Timothy Head, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 483 days.

(21) Appl. No.: 18/062,881

(22) Filed: Dec. 7, 2022

(65) Prior Publication Data

US 2024/0192123 A1    Jun. 13, 2024

(51) Int. Cl.
   *G01N 17/04*    (2006.01)
   *G01N 17/00*    (2006.01)

(52) U.S. Cl.
   CPC ........... *G01N 17/04* (2013.01); *G01N 17/002* (2013.01)

(58) Field of Classification Search
   CPC .... G01N 17/002; G01N 17/02; G01N 17/006; G01N 17/043; G01N 17/046; G01N 17/04
   See application file for complete search history.

(56) References Cited

U.S. PATENT DOCUMENTS

| | | |
|---|---|---|
| 3,521,959 A | 7/1970 | Fassel et al. |
| 4,005,178 A | 1/1977 | LeBlanc |
| 4,539,846 A | 9/1985 | Grossman |
| 4,783,997 A | 11/1988 | Lynnworth |
| 6,125,912 A | 10/2000 | Branagan et al. |
| 6,143,431 A | 11/2000 | Webster |

(Continued)

FOREIGN PATENT DOCUMENTS

| | | |
|---|---|---|
| CA | 3179052 | 11/2021 |
| CN | 102795601 | 11/2012 |

(Continued)

OTHER PUBLICATIONS

Hoyt, N. et al. "Online Monitoring of Molten Salt Reactors," Argonne National Laboratory (2019).

(Continued)

*Primary Examiner* — Gurpreet Kaur
(74) *Attorney, Agent, or Firm* — King & Spalding LLP

(57) ABSTRACT

A device for in-situ corrosion monitoring in a molten salt reactor system includes a mounting structure and a plurality of probes. Each probe of the plurality of probes may have a main portion and a thinned region that together define a sealed chamber with the mounting structure. Each thinned region of the plurality of probes may be configured to corrosively fail, when exposed to a corrosive environment, both: (i) before any main portion of the plurality of probes, and (ii) temporarily in series with the other thinned portions of the plurality of probes. The device may further include a plurality of sensing features corresponding to the plurality of probes, each sensing feature disposed in a respective sealed chamber of the plurality of probes. Each sensing feature may be configured to detect a breach of the respective sealed chamber caused by the corrosive failure of the thinned region.

13 Claims, 11 Drawing Sheets

(56) References Cited

U.S. PATENT DOCUMENTS

| | | |
|---|---|---|
| 6,258,185 B1 | 7/2001 | Branagan et al. |
| 6,318,192 B1 | 11/2001 | Carbone |
| 6,490,927 B2 | 12/2002 | Braunling et al. |
| 6,699,455 B2 | 3/2004 | Bulan et al. |
| 6,710,335 B2 | 3/2004 | Ellson et al. |
| 6,841,140 B2 | 1/2005 | Nishmimura et al. |
| 6,983,654 B2 | 1/2006 | Balin |
| 7,011,736 B1 | 3/2006 | Miller et al. |
| 7,322,251 B2 | 1/2008 | Gysling et al. |
| 7,960,581 B2 | 6/2011 | Vreede et al. |
| 8,636,892 B2 | 1/2014 | Koehl et al. |
| 8,642,954 B2 | 2/2014 | Ivaldi et al. |
| 8,746,440 B2 | 6/2014 | Williamson et al. |
| 8,771,482 B2 | 7/2014 | Bailey et al. |
| 8,900,439 B2 | 12/2014 | Wiedmeyer et al. |
| 8,956,524 B2 | 2/2015 | Wiedmeyer et al. |
| 8,968,547 B2 | 3/2015 | Loewen et al. |
| 9,017,527 B2 | 4/2015 | Wiedmeyer et al. |
| 9,150,975 B2 | 10/2015 | Berger et al. |
| 9,287,099 B2 | 3/2016 | Otsuka et al. |
| 9,295,923 B2 | 3/2016 | Mezheritsky et al. |
| 9,299,464 B2 | 3/2016 | Venneri |
| 9,305,673 B2 | 4/2016 | Heinold et al. |
| 9,347,807 B2 | 5/2016 | Ao |
| 9,475,706 B2 | 10/2016 | Policke et al. |
| 9,620,248 B2 | 4/2017 | Venneri |
| 9,638,607 B1 | 5/2017 | Hawthorne et al. |
| 9,847,149 B2 | 12/2017 | Spoerke et al. |
| 9,941,025 B2 | 4/2018 | Ahlfeld et al. |
| 9,968,899 B1 | 5/2018 | Gellaboina |
| 10,032,528 B2 | 7/2018 | Venneri |
| 10,056,160 B2 | 8/2018 | LeBlanc |
| 10,109,378 B2 | 10/2018 | Snead |
| 10,109,382 B2 | 10/2018 | Hackett et al. |
| 10,141,079 B2 | 11/2018 | Czerwinski et al. |
| 10,221,499 B2 | 3/2019 | Miller et al. |
| 10,280,527 B2 | 5/2019 | Loewen et al. |
| 10,317,262 B2 | 6/2019 | Kippersund |
| 10,416,045 B2 | 9/2019 | Launiere et al. |
| 10,438,705 B2 | 10/2019 | Cheatham, III |
| 10,475,543 B2 | 11/2019 | Venneri |
| 10,566,096 B2 | 2/2020 | Czerwinski |
| 10,573,416 B2 | 2/2020 | Venneri |
| 10,685,750 B2 | 6/2020 | Eichel et al. |
| 10,830,689 B2 | 11/2020 | Hedtke |
| 10,878,971 B2 | 12/2020 | Venneri |
| 11,101,048 B2 | 8/2021 | Venneri |
| 11,136,245 B2 | 10/2021 | Benson |
| 11,170,901 B2 | 11/2021 | Cheatham, III |
| 11,189,383 B2 | 11/2021 | Snead |
| 11,200,991 B2 | 12/2021 | LeBlanc |
| 11,226,281 B1 | 1/2022 | Findikoglu et al. |
| 11,276,503 B2 | 3/2022 | Cisneros |
| 11,286,172 B2 | 3/2022 | Russell, II et al. |
| 11,373,765 B2 | 6/2022 | Czerwinski |
| 11,459,662 B2 | 10/2022 | Murahara |
| 11,501,883 B2 | 11/2022 | Eichel et al. |
| 2004/0093957 A1 | 5/2004 | Buess et al. |
| 2006/0000071 A1 | 1/2006 | Lin |
| 2009/0046825 A1 | 2/2009 | Dulka et al. |
| 2009/0101522 A1* | 4/2009 | Xu .................... G01N 27/411 204/404 |
| 2012/0302811 A1 | 11/2012 | Long |
| 2015/0040727 A1 | 2/2015 | Kosslow |
| 2015/0107371 A1 | 4/2015 | Khrakovsky |
| 2015/0310948 A1 | 10/2015 | Venneri |
| 2016/0189812 A1 | 6/2016 | Czerwinski |
| 2016/0189813 A1 | 6/2016 | Cisneros, Jr. |
| 2016/0217874 A1 | 7/2016 | Dewan et al. |
| 2017/0271033 A1 | 9/2017 | Dodson et al. |
| 2017/0292179 A1 | 10/2017 | Hackett |
| 2017/0294241 A1 | 10/2017 | Dodson et al. |
| 2017/0294242 A1 | 10/2017 | Simpson et al. |
| 2017/0301413 A1 | 10/2017 | Cisneros, Jr. |
| 2017/0301418 A1 | 10/2017 | Dodson et al. |
| 2018/0254109 A1 | 9/2018 | Cheatham, III et al. |
| 2019/0015806 A1 | 1/2019 | Gellaboina |
| 2019/0057783 A1 | 2/2019 | LeBlanc |
| 2019/0139665 A1 | 5/2019 | Czerwinski et al. |
| 2019/0371482 A1 | 12/2019 | Benson |
| 2020/0087156 A1 | 3/2020 | Kelleher |
| 2020/0122109 A1 | 4/2020 | Kruizenga et al. |
| 2020/0161015 A1 | 5/2020 | Czerwinski et al. |
| 2020/0180975 A1 | 6/2020 | Benson |
| 2021/0130181 A1 | 5/2021 | Brown et al. |
| 2021/0210235 A1 | 7/2021 | Venneri |
| 2022/0005617 A1 | 1/2022 | Snead |
| 2022/0051818 A1 | 2/2022 | Cisneros, Jr. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0390334 A1 | 12/2022 | Jorgensen |
| 2023/0104365 A1 | 4/2023 | Eichel et al. |
| 2024/0167919 A1 | 5/2024 | Biegalski |
| 2024/0192123 A1 | 6/2024 | Robison |

FOREIGN PATENT DOCUMENTS

| | | |
|---|---|---|
| CN | 203080087 U | 7/2013 |
| CN | 102967494 B | 4/2015 |
| CN | 103714371 B | 5/2016 |
| CN | 104090004 B | 5/2016 |
| CN | 106128533 A | 11/2016 |
| CN | 106283112 A | 1/2017 |
| CN | 106425315 A | 2/2017 |
| CN | 107230506 A | 10/2017 |
| CN | 106158053 B | 11/2017 |
| CN | 107344726 A | 11/2017 |
| CN | 106180254 B | 6/2018 |
| CN | 108172318 A | 6/2018 |
| CN | 108389634 A | 8/2018 |
| CN | 109141969 A | 1/2019 |
| CN | 109207128 A | 1/2019 |
| CN | 105838339 B | 3/2019 |
| CN | 109509562 A | 3/2019 |
| CN | 106621429 B | 4/2019 |
| CN | 106840765 A | 4/2019 |
| CN | 109671510 A | 4/2019 |
| CN | 106902526 B | 6/2019 |
| CN | 106477618 B | 7/2019 |
| CN | 110042434 A | 7/2019 |
| CN | 105420737 B | 9/2019 |
| CN | 105463306 B | 9/2019 |
| CN | 106221678 B | 9/2019 |
| CN | 108179432 B | 9/2019 |
| CN | 110194494 A | 9/2019 |
| CN | 107469628 B | 10/2019 |
| CN | 108109710 B | 10/2019 |
| CN | 209496626 U | 10/2019 |
| CN | 108231224 B | 12/2019 |
| CN | 108511089 B | 12/2019 |
| CN | 106517097 B | 2/2020 |
| CN | 110783010 A | 2/2020 |
| CN | 210803355 U | 6/2020 |
| CN | 108956744 B | 7/2020 |
| CN | 109637682 B | 9/2020 |
| CN | 106957636 B | 10/2020 |
| CN | 110203886 B | 10/2020 |
| CN | 109011696 B | 12/2020 |
| CN | 112062567 A | 12/2020 |
| CN | 112111251 A | 12/2020 |
| CN | 112284170 A | 1/2021 |
| CN | 112322939 A | 2/2021 |
| CN | 112357885 A | 2/2021 |
| CN | 108956443 B | 3/2021 |
| CN | 109097001 B | 3/2021 |
| CN | 110689984 B | 3/2021 |
| CN | 109231241 B | 4/2021 |
| CN | 110444311 B | 5/2021 |
| CN | 112778012 A | 5/2021 |
| CN | 108088813 B | 6/2021 |
| CN | 112946046 A | 6/2021 |
| CN | 113174240 A | 7/2021 |
| CN | 213707743 U | 7/2021 |

(56) References Cited

FOREIGN PATENT DOCUMENTS

| | | |
|---|---|---|
| CN | 109680282 B | 9/2021 |
| CN | 113372886 A | 9/2021 |
| CN | 112391653 B | 11/2021 |
| CN | 113630582 A | 11/2021 |
| CN | 111334258 B | 12/2021 |
| CN | 113860350 A | 12/2021 |
| CN | 111627571 B | 2/2022 |
| CN | 112125281 B | 2/2022 |
| CN | 114086111 A | 2/2022 |
| CN | 215770541 U | 2/2022 |
| CN | 112695229 B | 3/2022 |
| CN | 112429772 B | 5/2022 |
| CN | 112479256 B | 5/2022 |
| CN | 111141670 B | 6/2022 |
| CN | 111627569 B | 7/2022 |
| CN | 114813222 A | 7/2022 |
| CN | 112530614 B | 8/2022 |
| CN | 112700895 B | 8/2022 |
| CN | 114842989 A | 8/2022 |
| CN | 112151197 B | 9/2022 |
| CN | 112891973 B | 9/2022 |
| CN | 113044378 B | 9/2022 |
| CN | 114288837 B | 9/2022 |
| CN | 217405118 U | 9/2022 |
| CN | 112551567 B | 11/2022 |
| CN | 112992389 B | 11/2022 |
| CN | 113603059 B | 11/2022 |
| CN | 112587989 B | 12/2022 |
| CN | 112863725 B | 12/2022 |
| CN | 112863726 B | 12/2022 |
| CN | 113241200 B | 12/2022 |
| JP | 2002147695 | 5/2022 |
| KR | 10-2021-0008784 | 1/2002 |
| WO | WO 2015017928 | 2/2015 |
| WO | WO 2015094450 | 10/2015 |
| WO | WO 2017019620 | 2/2017 |
| WO | WO 2017032379 | 3/2017 |
| WO | WO 2017106509 | 6/2017 |
| WO | WO 2017171937 | 10/2017 |
| WO | WO 2017172177 | 10/2017 |
| WO | WO 2017172948 | 10/2017 |
| WO | WO 2017192611 | 11/2017 |
| WO | WO 2017199059 | 2/2018 |
| WO | WO 2018026536 | 2/2018 |
| WO | WO 2018027170 | 2/2018 |
| WO | WO 2018031148 | 2/2018 |
| WO | WO 2018031681 | 2/2018 |
| WO | WO 2018052529 | 3/2018 |
| WO | WO 2018064572 | 4/2018 |
| WO | WO 2018169588 | 10/2018 |
| WO | WO 2018213669 | 1/2019 |
| WO | WO 2019231971 | 1/2020 |
| WO | WO 2020123513 | 8/2020 |
| WO | WO 2022006169 | 1/2022 |
| WO | WO 2022076084 | 6/2022 |
| WO | WO 2022146446 | 7/2022 |

OTHER PUBLICATIONS

Hoffman, "Fudamentals of Ultrasonic-Flow Measurements for Industrial Applications," Krohne Messtechnik GmbH & Co. KG Duisburg, 2000, 31 pages.

A sampling device for molten-salt systems' (McDonald et al.), Mar. 7, 1960 (Mar. 7, 1960). [online, retrieved from <URL:https://www.ostl.gov/serv!ets/purl/4187309>.

Operation of the Sampler Enricher in the Molten Salt Reactor Experiment' {Gallaher}, Oct. 2, 1971 (Oct. 2, 1971), (online], retrieved from.

Blain R. Lancaster, High Resolution Distributed Temperature Measurements Using Optical Fibers in a Molten Salt Forced Convection Environment, Texas A&M University, pp. 1-53 (Year: 2021).

Harkema et al. Development and Demonstration of a Prototype Molten Salt Sampling Sys-tem. Idaho National Laboratory [online]. Jan. 2023.

McFarlane et al. Fission Product Volatility and Off-Gas Systems for Molten Salt Reactors. US De-partment of Energy, Sep. 3, 2019.

\* cited by examiner

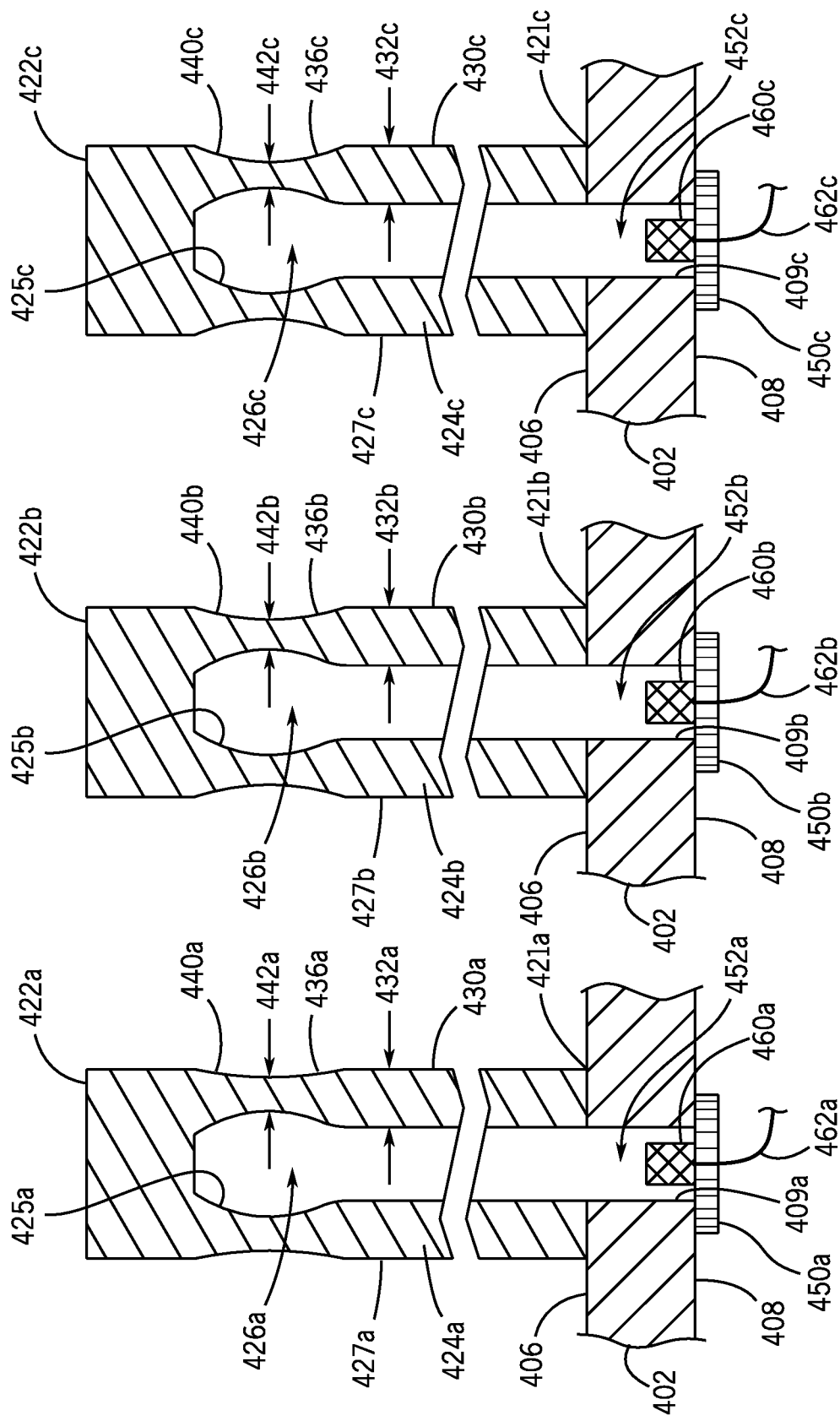

IN-SITU CORROSION MONITORING DEVICE AND METHODS OF USE THEREOF

TECHNICAL FIELD

The described examples relate generally to systems, devices, and techniques for in-situ monitoring of a process fluid.

BACKGROUND

Corrosion monitoring in molten salt systems may be conducted using a coupon inserted in the molten salt. After a period of time, such coupons may be removed from the salt and analyzed. While an analysis of the coupon may yield information regarding the direct extent of corrosion on the coupon, this conventional method ultimately requires physical removal of coupon. Coupon extraction may be burdensome and impractical, particularly in a molten salt system, which may not be readily taken offline. Further, it may be desirable to measure corrosion of the coupon and other materials in molten salt system in order assess, among other characteristics, the redox potential associated with fluids of the system. Such information may be used to determine characteristics about fuel quality and reactor performance, among other characteristics. However, due to the limitations of conventional, coupon-based corrosion monitoring techniques in molten salt systems, real-time analysis and validation of redox potential and other associated characteristics may be hindered or impractical. As such, there is a need for systems and techniques to facilitate corrosion monitoring in a molten salt system in a manner that supports real-time analysis and validation of redox potential of the system.

SUMMARY

In one example, a device for in-situ corrosion monitoring in a molten salt reactor system is disclosed. The device includes a mounting structure. The device further includes a plurality of probes. Each probe of the plurality of probes has a main portion and a thinned region that together define a sealed chamber with the mounting structure. Each thinned region of the plurality of probes is configured to corrosively fail, when exposed to a corrosive environment, both: (i) before any main portion of the plurality of probes, and (ii) temporarily in series with the other thinned portions of the plurality of probes. The device further includes a plurality of sensing features corresponding to the plurality of probes, each sensing feature disposed in a respective sealed chamber of the plurality of probes. Further, each sensing feature is configured to detect a breach of the respective sealed chamber caused by the corrosive failure of the thinned region.

In another example, at least one probe of the plurality of probes includes a structural body. The main portion and the thinned region may be integrally formed structures of the structural body.

In another example, the structural body may define a central hollow portion therein that establishes a volume of a sealed chamber of the at least one probe. The thinned region may define a thinnest point of separation between the central hollow portion and an external environment of the at least one probe.

In another example, the structural body may have a predetermined window thickness at the thinnest point of separation that is configured to cause the thinned region to corrosively fail after a first time period when exposed to the corrosive environment.

In another example, the volume of the sealed chamber of the at least one probe may be filled with an inert gas. Further, in response to a breach of the sealed chamber, fluids and gases external to the at least one sensor probe enters the central hollow portion. In turn, a sensing feature of the at least one probe may be configured to detect a presence of the fluids or gases in the central hollow portion.

In another example, the device may further include a processing unit communicatively coupled with the sensing feature and configured to determine, based on the detection of the presence of the fluids or gases in the central hollow portion, a time of the breach. The processing unit may be further configured to determine, based on the time of breach and an indication of a starting time of the at least one probe in the corrosive environment, a duration of the at least one probe in the corrosive environment. The processing unit may be further configured to determine, based on the duration of the at least one probe in the corrosive environment and the predetermined window thickness, a value indicative of the corrosivity of the corrosive environment.

In another example, the processing unit may be further configured to receive, from a redox measurement system of the molten salt reactor system, a measured redox value associated with the corrosive environment. Additionally, the processing unit may be configured to validate the measured redox value by correlating the value indicative of the corrosivity of the corrosive environment with the measured redox value.

In another example, the thinned region may have a width that is around three orders of magnitude less than a width of the main portion.

In another example, the width of the thinned region may be between 10 to 20 micrometers.

In another example, the structural body may be an elongated tubular structure, and the thinned region is defined about a complete circumference of the elongated tubular body.

In another example, the at least one sensing features may include an electrode configured to trigger an electrical response when exposed to a change in the composition, temperature, or pressure of the respective sealed chamber.

In another example, the electrode may be an electrode of a captative-based sensing system.

In another example, the mounting structure may include a flange configured to removably couple the device to a processes barrier of the molten salt reactor system.

In another example, a system for in-situ corrosion monitoring in a molten salt reactor system is disclosed. The system includes a process barrier containing a molten salt composition. The system further includes an in-situ device at least partially in the molten salt composition. The in-situ device is configured to indicate a time of corrosive failure for each of a plurality of thinned regions of the device, each thinned region of the plurality of thinned regions has a predetermined thickness configured to corrosively fail after a set time period when exposed to a corrosive environment that is different from each other thinned region of the plurality of thinned regions. The system further includes an external monitoring system configured to determine a value indicative of corrosivity of the corrosive environment based on the indicated time of the corrosive failure for a respective thinned region.

In another example, the external monitoring system may be further configured to receive, from a redox measurement system of the molten salt reactor system, a measured redox value associated with the corrosive environment. Further, the redox measurement system may be configured to validate the measured redox value by correlating the value indicative of the corrosivity of the corrosive environment with the measured redox value.

In another example, the process barrier may include a stainless steel pipe through which the molten salt composition flows. The in-situ device may be arranged at least partially in the stainless steel pipe with a plurality of probes in the flow of the molten salt composition.

In another example, the in-situ device may include a mounting structure removably coupled with a complementary mounting feature of the stainless steel pipe. Further, the in-situ device may include the plurality of probes, in which each probe of the plurality of probes has a main portion and the thinned region that together define a sealed chamber with the mounting structure. Each thinned region of the plurality of probes is configured to corrosively fail, when exposed to a corrosive environment, both: (i) before any main portion of the plurality of probes, and (ii) temporarily in series with the other thinned portions of the plurality of probes. A plurality of sensing features may correspond to the plurality of probes, in which each sensing feature disposed in a respective sealed chamber of the plurality of probes.

In another example, a method of in-situ corrosion monitoring is disclosed. The method includes arranging an in-situ corrosion monitoring device at least partially in a molten salt composition. The in-situ corrosion monitoring device is configured to indicate a time of corrosive failure for each of a plurality of thinned regions of the device. The method further includes detecting, while the in-situ corrosion monitoring device remains at least partially in the molten salt composition, each of: (i) a corrosive failure of a first thinned region of the plurality of thinned regions, and (ii) a corrosive failure of a second thinned region of the plurality thinned regions.

In another example, the detecting further includes detecting a change in one or more of a capacitance, a temperature, or a pressure of a sealed chamber associated with the respective thinned region.

In another example, the method further includes determining, based on the detection of each of the corrosive failures, a value indicate of the corrosivity of the corrosive environment. The method further includes receiving, from a redox measurement system of the molten salt reactor system, a measured redox value associated with the corrosive environment. The method further includes validating the measured redox value by correlating the value indicative of the corrosivity of the corrosive environment with the measured redox value.

In addition to the example aspects described above, further aspects and examples will become apparent by reference to the drawings and by study of the following description.

BRIEF DESCRIPTION OF THE DRAWINGS

FIG. 4B depicts a cross-sectional view of a first probe of the example corrosion monitoring device of FIG. 4A, taken along line 4B-4B of FIG. 4A.

FIG. 4C depicts a cross-sectional view of a second probe of the example corrosion monitoring device of FIG. 4A, taken along line 4C-4C of FIG. 4A.

FIG. 4D depicts a cross-sectional view of a third probe of the example corrosion monitoring device of FIG. 4A, taken along line 4D-4D of FIG. 4A.

Figure 1:
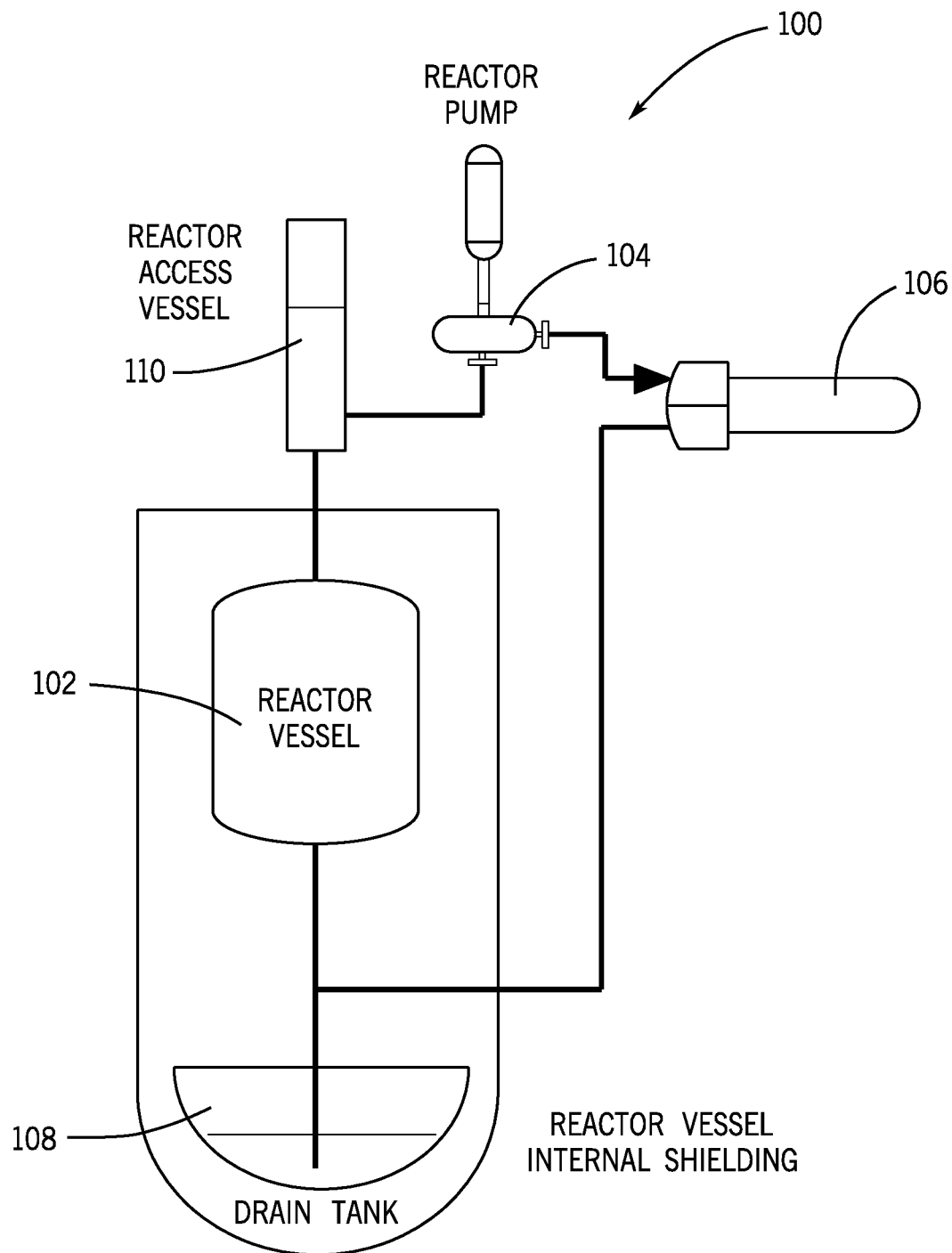
FIG. 1 depicts a schematic representation of an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to an in-situ device for corrosion monitoring in a molten salt reactor system. A molten salt reactor system may broadly include any of a variety of molten salt reactors that are used to produce nuclear power in part by utilizing molten salts as a nuclear fuel in place of the conventional solid fuels used in light water reactors. Advantages include efficient fuel utilization and enhanced safety (in part due to replacing water as a coolant with molten salt). In molten salt reactors, fission reactions occur within a molten salt composition housed within a reactor vessel. This composition, or more generally referred to herein as a process fluid, may be circulated through a reactor vessel, a reactor pump, a heat exchanger, and/or other associated process equipment in the molten salt system. The process fluid may include any of a number of substances that may exhibit corrosivity, including, without limitation LiF, $BeF_2$, and $UF_4$ among others. It may be desirable to measure redox potential of these and other process fluids of molten salt reactor system, for example, in order to assess fuel quality and reactor performance, among other characteristics. Electrode-based redox measurement systems may be used to predict redox potential of the process fluid; however, the output of such systems may beneficially be correlated with a measurement of corrosion on a structure immersed in the process fluid in order validate such output. Conventional techniques in which a coupon is immersed in the process fluid require physical extraction of the coupon for analysis, which may be burdensome or impractical.

To mitigate these and other challenges, the corrosion monitoring device of the present disclosure may be installed in-situ in the molten salt system. The in-situ corrosion monitoring device may generally be configured to indicate a time of failure for each of a plurality of material regions (also referred to herein as "windows" or "thinned regions"). Each material region of the plurality of material regions may have a different predefined material thickness. The in-situ device may be configured to detect a time of failure for each of the material regions and, based in part on the known, predefined material or wall thickness of the material, determine a value indicative of the corrosivity of the system. The value indicative of corrosivity of the system may be correlated with a redox measurement from an associated electrode system in order to validate the redox measurement. In one example implementation, the plurality of material regions may be arranged in the process fluid so that the material regions fail temporarily in series, without removal of the in-situ device from the process fluid. In this regard, the in-situ device may monitor corrosion and validate redox measurements over time, without necessarily removing the device from the molten salt system.

To facilitate the foregoing, the in-situ corrosion monitoring device may include a mounting structure and a plurality of probes mounted on the mounting structure. The mounting structure may facilitate removable attachment of the in-situ device to the molten salt system, such as via flange or other fitting, and the probes may extend from the mounting structure for arrangement into a process fluid of the molten salt system. Each probe of the plurality of probes may have a main portion and a thinned region (or window) that together define a sealed chamber with the mounting structure. As described herein, the thinned region may be a thinned or machined-down region of the main portion, such that the thinned region fails before the main portion. Each thinned region of probes may have a different wall or material thickness such that when the plurality of probes are collectively arranged in the process fluid, the thinned regions corrosively fail temporarily in series. The in-situ device further includes a plurality of sensing features corresponding to the plurality of probes, with each sensing feature disposed in a respective sealed chamber of the plurality of probes. The sensing feature may be an electrode of a sensor, such as, without limitation, an electrode of capacitive sensor, a pressure transducer, a thermocouple, and/or other sensor. Each sensing feature may therefore be configured to detect a breach of the respective sealed chamber caused by the corrosive failure of the thinned region. The breach may be communicated to a processing unit or other external monitoring system in order to determine a variety of parameters including, the time of breach, certain values indicative of corrosivity of the system, and the validation of the redox measurement, among other characteristics.

Turning to the drawings, for purposes of illustration, FIG. 1 depicts a schematic representation of an example molten salt reactor system 100. The molten salt reactor system 100 may implement and include the in-situ monitoring device, as described in greater detail below. As will be understood and appreciated, the example shown in FIG. 1 represents merely one example environment in which the in-situ monitoring device may be utilized. It will be understood that the in-situ monitoring device and assemblies described herein may be used in and with substantially any other environment or operating system, such as those associated with other corrosive environments.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be $LiF—BeF_2—UF_4$, though other compositions of fuel salts may be utilized as fuel salts within the reactor system 100. The fuel salt within the system 100 is heated to high temperatures (about 700° C.) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110). The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride ($UF_4$) to the system 100 as necessary to bring the reactor to a critical state and compensate for depletion of fissile material.

In several examples, the in-situ corrosion monitor disclosed herein may be utilized to measure corrosion of the process fluid, for example, along a pipe that connects one or more of the vessels and other components of the molten salt reactor system 100. For example, the in-situ device may be integrated with a run of pipe or segment between one or more of the reactor vessel 102, the reactor access vessel 110, the pump 104, the heat exchanger 106, and/or the drain tank 108. Additionally or alternatively, the in-situ device may be integrated with a side run or by-pass pipe along the pipe of the main loop in order facilitate removal. Additionally or alternatively, the in-situ monitoring device may be integrated with a vessel or component itself. For example, the in-site device may be integrated with, such as being attached to or in-situ with the fluid of or otherwise installed with, one or more of the reactor vessel 102, the reactor access vessel 110, the pump 104, the heat exchanger 106, and/or the drain tank 108 and/or other component of the reactor system 100.

Figure 2:
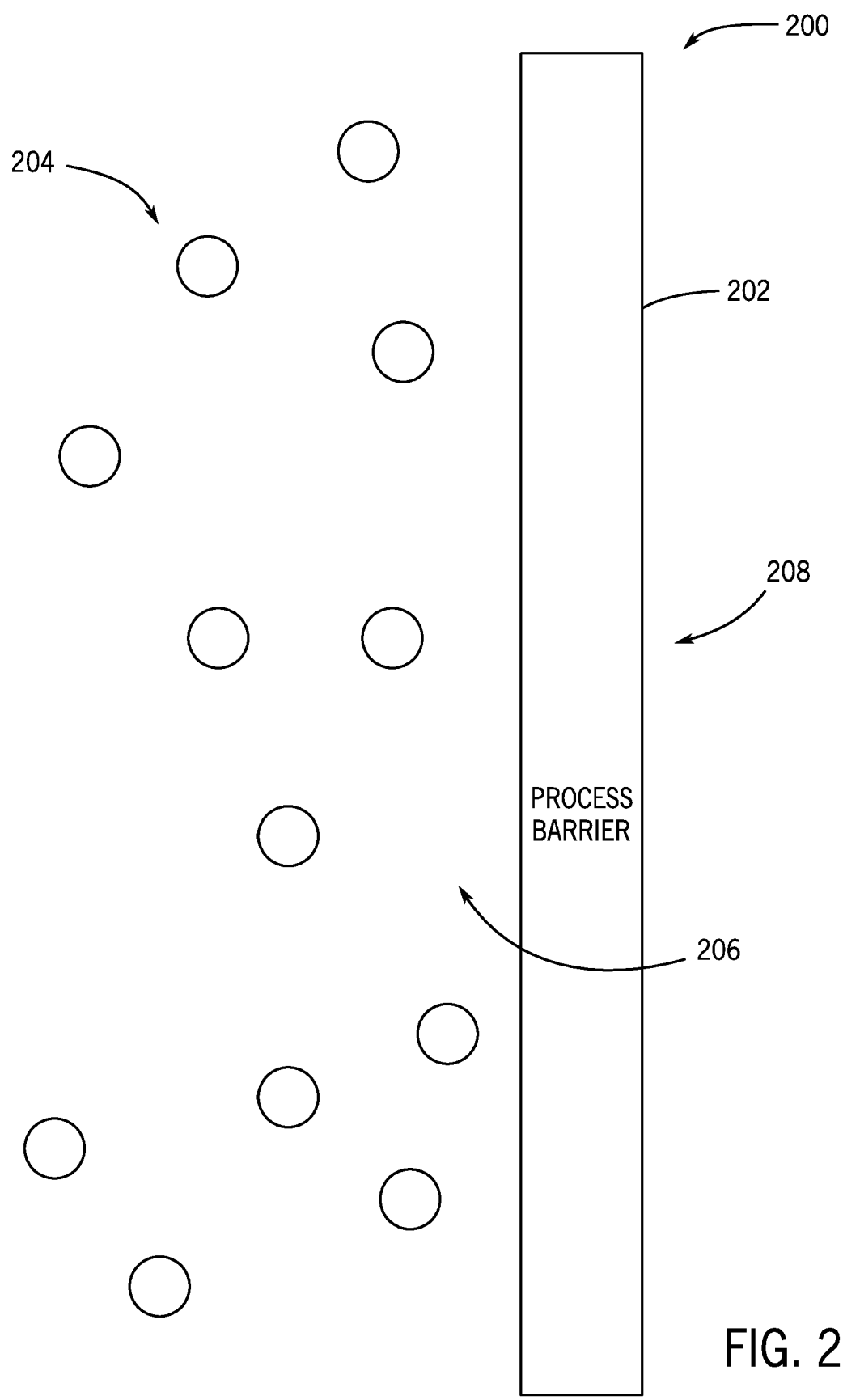
FIG. 2 depicts a schematic representation of an example process of the molten salt reactor system of FIG. 1.

FIG. 2 depicts a schematic representation of an example process 200 of the molten salt reactor system 100 of FIG. 1. For example, the process 200 may be a portion of a pipe run between one or more of reactor vessel 102, the reactor access vessel 110, the pump 104, the heat exchanger 106, and/or the drain tank 108 and/or other component of the reactor system 100, shown in FIG. 1. In other cases, the process 200 may be a portion of one or more of the reactor vessel 102, the reactor access vessel 110, the pump 104, the heat exchanger 106, and/or the drain tank 108 and/or other component of the reactor system 100 shown in FIG. 1. In this regard, FIG. 2 shows the process 200 as including a process barrier 202 and a process fluid 204. The process barrier 202 may be a pipe or vessel wall or other structure that is configured to maintain the process fluid 204 within an internal environment 206, and to separate the process fluid 204 from an external environment 208.

As described herein, the process fluid 204 may be substantially any composition of fluid, including a composition of solids, liquids, and gases that may be present in the molten salt system 100 of FIG. 1. For example, the process fluid 204 may be a fluid that exhibits certain corrosive properties, and may include, without limitation a substance including $LiF$, $BeF_2$, and $UF_4$, and/or other substances of the molten salt system 100. It may be desirable to measure redox potential of these and other process fluids of molten salt reactor system, for example, in order to assess fuel quality and reactor performance, among other characteristics. However, the process fluid 204 may be required to be maintained in the internal environment 206 by the process barrier 208, which may ultimately hinder measurement techniques that use corrosion based coupons and other conventional techniques.

Figure 3A:
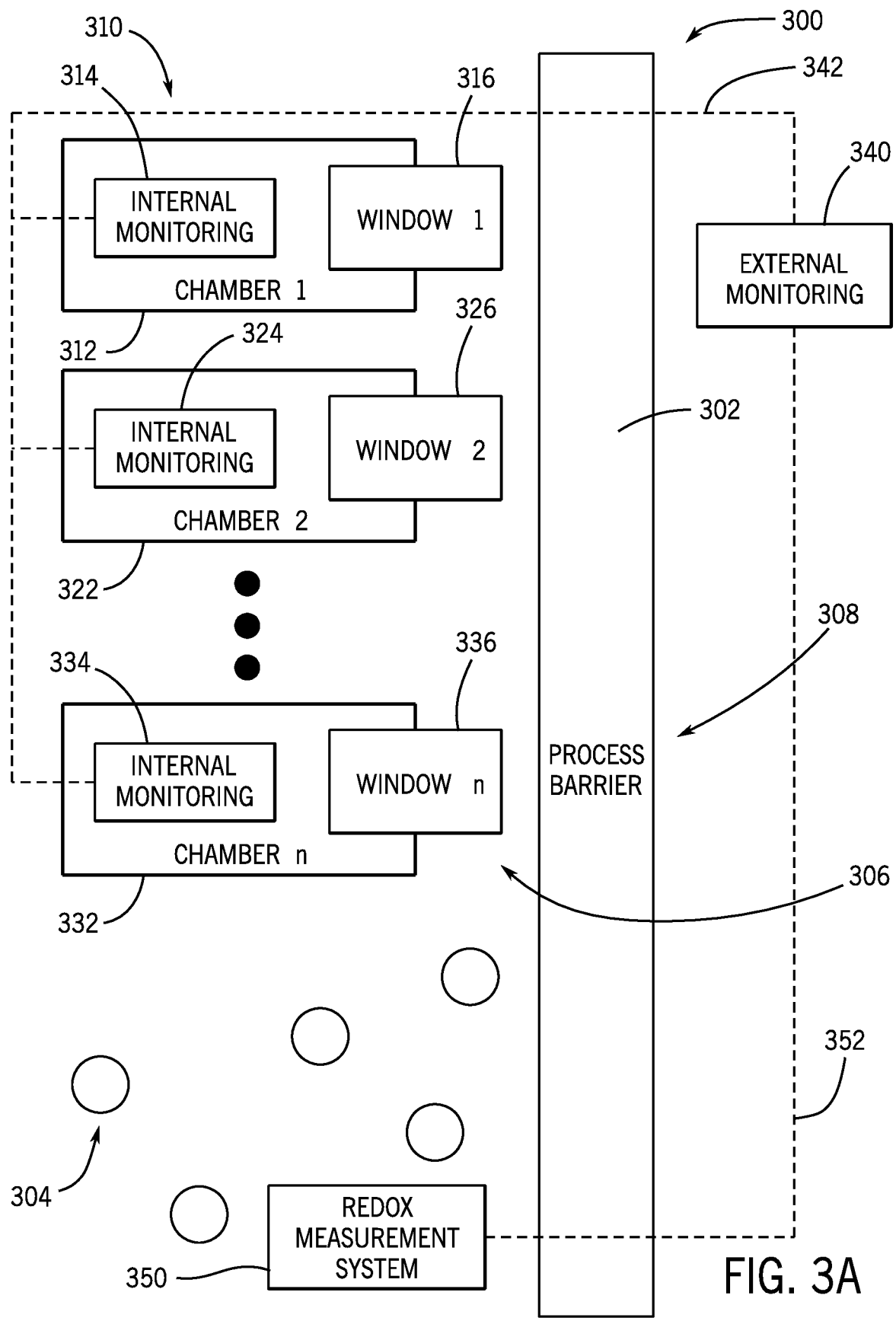
FIG. 3A depicts a schematic representation of an example corrosion monitoring system.

Turning to FIG. 3A, a schematic representation of an example corrosion monitoring system 300 of the present disclosure is depicted. The system 300 is shown, schematically, with a process barrier 302, a process fluid 304, an internal environment 306, and an external environment 308, each of which may be substantially analogous to the corresponding elements depicts in FIG. 2. The corrosion monitoring system 300 may be configured to monitor, in-situ, the corrosive proprieties and redox potential of the process fluid 304. To facilitate the foregoing, the system 300 is depicted, schematically, as including an in-situ corrosion monitoring device 310, an external monitoring module 340, and a redox measurement system module 350. Broadly, the device 310 may be configured to indicate a time of corrosive failure of one or more material portions (thinned regions or windows) of a probe that is submerged in the process fluid 304. The redox measurement system module 350 is broadly configured to produce a measurement of a redox potential of the process fluid 304 using an electrode-based measurement system. Further, the external monitoring module 340 may broadly be configured to receive the indication and the corrosive failure from the device 310 and the measured redox value from the redox measurement system module 350 and determine one or more calculated properties, such as validating the redox measurement from the redox measurement system module 350.

The device 310 is depicted in FIG. 3A in the form of schematic functional modules. It will be appreciated that the modules of FIG. 3A are not necessarily indicative of any particular dimensional or structural relationship. Rather, the modules of FIG. 3A are shown in reference to functional operation of the device 310, and that in other examples, such as that shown and described herein with reference to FIGS. 4A-4E, the device 310 may include one or more specific structural configurations, as contemplated herein.

The device 310 may broadly include a plurality of chambers that are emersed in, and sealed from, the process fluid 304. Each chamber may have a "window" or thinned region or other set material area that is exposed to the process fluid 304, and that is designed to corrosively fail after a set time period when immersed in a corrosive environment. Upon the corrosive failure of the window such associated chamber may begin to fill with the process fluid 304 and cause a sensing feature to indicate a breach of the process fluid in the chamber. The device 310 may include multiple such chambers and associated windows, each with a different thickness, such that device 310 may measure the time of failure for multiple such windows over time.

To facilitate the foregoing, the device 310 is illustrated in FIG. 3A, schematically, as including a first chamber module 312, a first window module 316, and a first internal monitoring module 314. The first chamber module 312 may generally include any appropriate components formed from a corrosion resistant material, such as certain stainless steels. Such components of the first chamber module 312 may be any appropriate shape, including elongated structures having a circle or rectangular, or other cross-section, and may be configured to define a sealed volume therein for an inert gas despite the submersion of the first chamber module 312 in the process fluid 304. The first window module 316 includes any appropriate thinned material region of the material that generally defines the sealed chamber or volume. For example, where the first chamber module 312 includes components formed from a stainless steel material, the first window module 316 may include a portion of such stainless steel material that has a thickness that is less than, such as one or two or three orders of magnitude less than a wall thickness of the main body of the stainless steel material. In this regard, when the device 310 is submerged in the process fluid 304 or other corrosive environment, the thinner material region of the first window module 316, and not the main body of the stainless steel material, will corrosively fail first. The corrosive failure of the thinned region at the first window module 316 may be detected by component of the first internal monitoring module 314. For example, the first internal monitoring module 314 may include one or more electrodes of a sensor, including, but not limited to, a capacitive sensor, a thermocouple, a pressure sensor, or other sensor. Upon breach or intrusion of the process fluid in the first chamber module 312, the sensing features of the first internal monitoring module 314 may detect the present of fluid and/or gas and send a signal indicative of the same to the external monitoring module 340.

The device 310 may include one or more additional chambers, each having associated windows. For example, FIG. 3A shows, schematically, a second chamber module 322, a second internal monitoring module 324, a second window module 326, a subsequent chamber module 332, a subsequent internal monitoring module 334, a subsequent window module 336, each of which may be substantially analogous to those described above with respect to the first chamber of the device 310. Notwithstanding the foregoing similarities, the second window module 326 may include a thinned region with a material thickness that is different from the material thickness of the thinned region of the first window module 316, and the subsequent window module 336 may have a material thickness that is different from each of a material thickness of the thinned regions of the first and second widow modules 316, 326. Accordingly, each of the window modules 316, 326, 336 may have a thinned region that fails at different times, or temporarily in series, assuming all are exposed to the process fluid 304 at a common time.

The system 300 may operate by receiving a signal from each of the internal monitoring modules 314, 324, 334 as the thinned region of each of the respective window modules 316, 326, 336 fails, such as receiving a signal via connectors 342. The external monitoring module 340 may receive such signals and associate a time of corrosive failure with each respective window module 316, 326, 336. Further, the external monitoring module 340 may associate the time of failure with the known or predetermined thickness of the material of the respective window modules 316, 326, 336. In turn, the external monitoring module 340 may be configured to determine one or more values indicative of, or that otherwise describes the corrosive environment exhibited by the process fluid 304. Further, the external monitoring module 340 may be configured to receive, from the redox measurement system module 350, a measured redox value associated with the process fluid 304, such as via connectors 352. The external monitoring module 340 may be configured to validate the measured redox value by correlating the value indicative of the corrosivity of the process fluid 304 with the measured redox value. In other cases, the external monitoring module 340 may be configured to complete other appropriate calculations using the device 310 and the redox measurement system module 350.

Figure 3B:
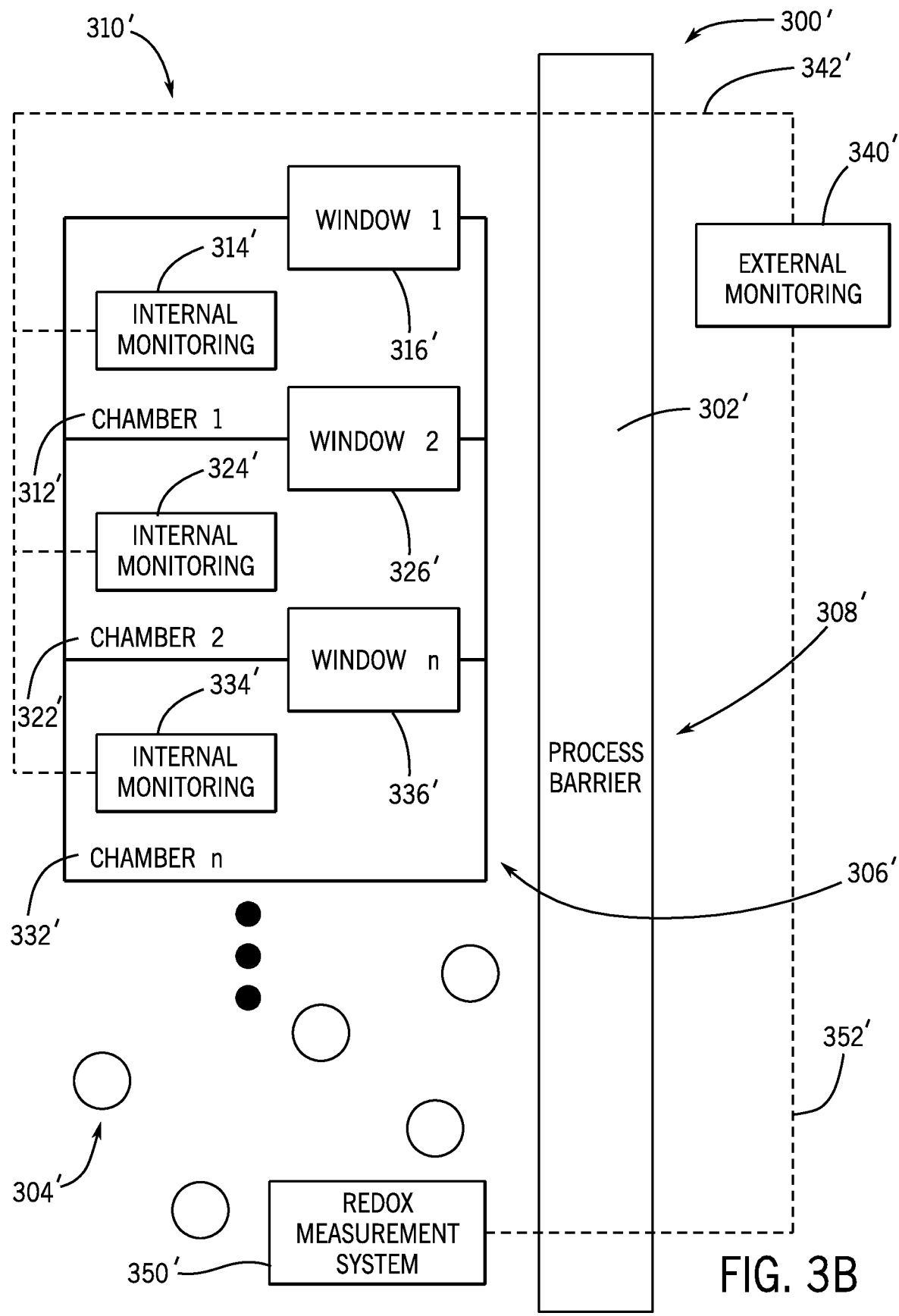
FIG. 3B depicts a schematic representation of another example corrosion monitoring system.

FIG. 3B depicts a schematic representation of an example corrosion monitoring system 300'. The corrosion monitoring system 300' may be substantially analogous to the corrosion monitoring system 300 of FIG. 3A and include, for example: a process barrier 302', process fluid 304', internal environment 306', external environment 308', an in-situ device 310', a first chamber module 312', a first internal monitoring module 314', a first window module 316', a second chamber module 322', a second internal monitoring module 324', a second window module 326', a subsequent chamber module 332', a subsequent internal monitoring module 334', a subsequent window module 336', an external monitoring module 340', connections 342', a redox measurement system module 350', and connections 352'; redundant explanation of which is omitted herein for clarity.

Notwithstanding the foregoing similarities, the corrosion monitoring system 300' is shown, schematically, in an alternative embodiment in which only the thinned region of the first window module 316' is exposed to the process fluid 304'. The thinned region of the second window module 326' may be exposed to the process fluid 304' only upon failure of the thinned region of the first window module 316', and the thinned region of the third window module 336' may be exposed to the process fluid 304' only upon failure of the thinned region of the first and second window modules 316', 326'. In this regard, rather than the thinned regions of the each of the window module 316', 326', 336' having different thickness (as may be the case for the device 300 of FIG. 3A), the thinned region of each of the window modules 316', 326', 336' may have the same thickness. Despite having a potentially similar thickness, the thinned regions of the each of the window modules 316', 326', 336' may still fail temporally in series due to the structural arrangement of chambers and associated windows. While many configurations of the device 310' are possible and contemplated herein, in one example, each of the chamber module 312', 322', 332' may be define an elongated stainless steel tube which are concentrically arranged with one another. Each tube may have a thinned region of material or "window" as described herein. Accordingly, as the outermost tube corrosively fails at the thinned region, the next outermost tube may begin to be exposed to the process fluid 304' and so forth in continue measuring the corrosive properties of the fluid 304' in-situ.

It will be appreciated that the in-situ devices 310 and 310' described above with respect to FIGS. 3A and 3B may be constructed according to a variety of techniques and using a variety of different components. FIGS. 4A-4E depict one example implementation of the device 310 described above in reference to FIG. 3A. In other example, other constructions of the in-situ devices are possible and contemplated herein.

Figure 4A:
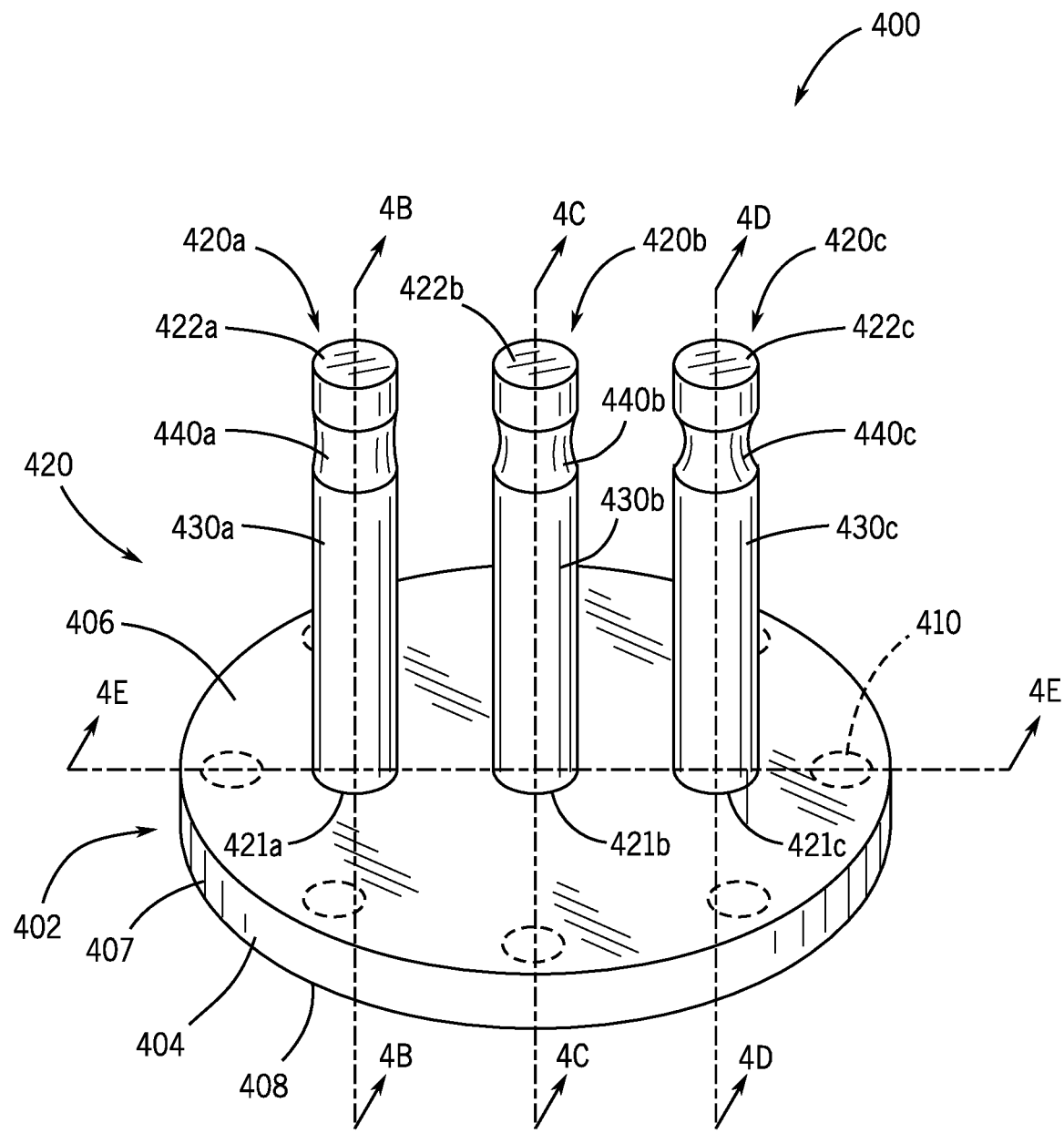
FIG. 4A depicts a perspective view of another example corrosion monitoring device.

For purposes of illustration, FIG. 4A depicts perspective view of another example corrosion monitoring device, an in-situ corrosion monitoring device 400. The device 400 may be substantially analogous, functionally, to the device 310 describe above in relation to FIG. 3A. In the example of FIG. 4A, the device 400 is shown as having a mounting structure 402 and a plurality of probes 420. The mounting structure 402 may be configured to facilitate the removable attachment of the device 400 to a molten salt system 100. The plurality of probes 420 may extend from the mounting structure 402 for submersion in a flow stream of the molten salt. The mounting structure 402 is shown in the example of FIG. 4A as having a mounting structure body 404 that generally defines a circular, flange-like shape, although other configurations are possible. The mounting structure body 404 may have a sufficient thickness and rigidity in order to withstand temperatures and pressures from the process fluid with which the device 400 is associated. The mounting structure body 404 is shown in FIG. 4A as defining an internal process surface 406 and an external process surface 408 that is generally arranged opposite the internal process surface 406. The mounting structure body 404 is further shown in FIG. 4A as defining a peripheral surface 407 that extends between the internal process surface 406 and the external process surface 408 and that defines an outermost surface or band about the mounting structure 402. In some cases, such as where the mounting structure 402 is formed as a flange-like shape or otherwise resembles or substantially is a flange, the mounting structure body 404 may further define a series of through holes 410 that are circumferentially spaced about a periphery of the mounting structure 402. In this regard, the series of through holes 410 may be configured to receive a fastener, such as a bolt, through one or more of the series of through holes 410 for securing the device 400 to a complementary feature of a process component (e.g., another flange) of the molten salt system. In other cases, the series of through holes 410 may be omitted, and the device 400 may be removably secured to the complementary feature by another mechanism, such as a clamp, a shoe, or other feature that secures the device 410 to the process component of the molten salt system.

FIG. 4A further shows the plurality of probes 420. Each probe of the plurality of probes 420 may be connected to the mounting structure 402 and extend therefrom for submersion into a process fluid of the molten salt system. For example, a first probe 420a of the plurality of probes 420 may extend from the mounting structure 402 at a first probe fixed end 421a to a first probe free end 422a. Further, a second probe 420b of the plurality of probes 420 may extend from the mounting structure 402 at a second probe fixed end 421b to a second probe free end 422b. Further, a third probe 420c of the plurality of probes 420 may extend from the mounting structure 402 at a third probe fixed end 421c to a third probe free end 422c.

Each probe of plurality of probes 420 may include a main portion and thinned region. As explained in greater detail below with reference to FIGS. 4B-4E, each probe may generally be an integrally formed or one-piece structure, such as being made from a single piece of stainless-steel tubing or pipe. Broadly, a first portion of the tubing (e.g., a main portion) may have a first wall thickness, whereas a second portion of the tubing (e.g., a thinned region) may have a second, reduced wall thickness. The second, reduced wall thickness of the second portion may be several orders of magnitude less than the wall thickness of the first portion such that the tubing is configured to corrosively fail at the second portion. In one example, the thinned region may be machined down to the desired wall thickness; however, other techniques are possible and contemplated herein. For purposes of illustration, FIG. 4A shows the first probe 420a as including a first probe main portion 430a and a first probe thinned region 440a. FIG. 4A further shows the second probe 420b as including a second probe main portion 430b and a second probe thinned region 440b. FIG. 4A further shows the third probe 420c as including a third probe main portion 430c and a third probe thinned region 440c. The thinned regions 440a-440c may extend about a complete perimeter, such as about a complete circumference of the respective probe. In other cases, the thinned region 440a-440c may be defined at only a section of a respective probes perimeter or circumference. While the plurality of probes 420 is shown in FIG. 4A as including three probes, it will be appreciated that in other embodiments, the plurality of probes 420 may include more or fewer probes, as appropriate for a given application.

With reference to FIG. 4B, a cross-sectional view of the first probe 420a of the corrosion monitoring device 400 of FIG. 4A is shown, taken along line 4B-4B of FIG. 4A. The first probe 420a may be defined by a structural body 424a. The structural body 424a may be a generally elongated structure extending from the first probe fixed end 421a to the first probe free end 422b. The structural body 424a may be formed from a stainless steel tubing, although other materials and compositions are possible. The stainless steel tubing or other suitable material of the structural body 424a may have a generally circular cross-section, and define a cylindrical shape; however, this is not required. The structural body 424a may have any appropriate shape as may be required for a given application, including shapes having a rectangular or triangular cross-section. As shown in FIG. 4B, the structural body 424a may define a central hollow portion 426a. The central hollow portion 426a may run a length of the structural body 424a and generally define a gas-fillable volume within the first probe 420a. The structural body 424a may further define an interior surface 425a and an exterior surface 427a. The interior surface 425a may define a volume of the central hollow portion 426a. The exterior surface 427a may be arranged generally opposite the interior surface 425a and may be a surface exposed or exposable to the process fluid of the molten salt system.

As shown in FIG. 4B, a thickness of the structural body 424a, such as a wall thickness, may change along a length of the structural body 424a between the first probe fixed end 421a and the first probe free end 422a. For example, the structural body 424a may have a main portion thickness 432a at the main portion 430a and a window thickness 442a at the thinned region 420a. The main portion thickness 432a may several orders of magnitude thicker than the window thickness 442a. In one example, the main portion thickness 432a may be in the range of around 10 to 20 millimeters, whereas the window thickness 442a may be in the range of around 10 to 20 micrometers. It will be appreciated that in other examples, other thickness of the main portion thickness 432a and the window thickness 442a are contemplated such that the window thickness 442a is substantially thinner than the main portion thickness 432a, which thereby allows the first probe 420a to corrosively fail first at the thinned region 440a. The structural body 424a may further define a transition section 436a between the main portion 430a and thinned region 440a which may define a gradual change in thickness between the main portion 430a and the thinned region 440a.

The thinned region 440a may define a thinnest point of separation between the interior surface 425a and the exterior surface 427a. This thinnest point of separation may be the window thickness 442a. This thinnest point of separation may be a predetermined material width that is configured to cause the thinned region 440a to corrosively fail after a set time period when exposed to a corrosive environment. As explained herein, the predetermined material width of each thinned region 440a-440c of the respective probes may be different so as to allow the thinned regions 440a-440c to fail temporarily, in series. In the example device 400, the thinned region 440a is shown as having a thicker material than the thinned region 440b of the second probe 420b and the thinned region 440c of the third probe 420c such that the thinned region 440a may be fail last, after a failure of the thinned regions 440b-440c.

As further shown in FIG. 4B, the structural body 424a may define a sealed chamber 426a with the mounting structure 402. For example, the mounting structure 402 may include a first sensor opening 409a. The first sensor opening 409a may be a through portion of the mounting structure body 404 that extends between the internal process surface 406 and the external process surface 408. The structural body 424a may be arranged relative to the first sensor opening 409a such that the central hollow portion 426a generally aligns with the first sensor opening 409a. The structural body 424a may be attached to the mounting structure 402 via a weld or other technique in order to permanently secure the structural body 424a to the mounting structure 402 at the first probe fixed end 421a and along the internal process surface 406. As further shown in FIG. 4B, a cap 450a may be fitted over the first sensor opening 409a along the external process surface 408. The cap 450a may be attached to the mounting structure 402 via a weld or other technique in order to permanently secure the cap 450a to the mounting structure 402 along the external process surface 408. In this regard, the first probe 420a, the mounting structure 402, and the cap 450a may, collectively operate to define the first sealed chamber 452a. The first sealed chamber 452a may be sealed from both a process fluid of the molten salt system and from at atmospheric environment outside of the molten salt system. In some cases, the first sealed chamber 452a may be filled with an inert gas, such as argon.

As further shown in FIG. 4B, a first sensing feature 460a may be arranged in the first sealed chamber 452a. The first sensing feature 460a may be an electrode of one or more sensors. For example, and without limitation, the first sensing feature 460a may be an electrode or other feature of a capacitive-based sensor, a thermocouple, a pressure transducer, and/or other sensor. The sensing feature 460a may be response to a change in a composition of the sealed chamber 452a, including indicating a presence of liquid intrusion into the sealed chamber 452a. The sensing feature 460a may further be responsive to a change or temperature or pressure in the sealed chamber 452a, such as that which may also be caused be caused by the instruction of liquid into the sealed chamber 452a.

FIG. 4C depicts a cross-sectional view of the second probe 420b of the example corrosion monitoring device 400 of FIG. 4A, taken along line 4C-4C of FIG. 4A. The second probe 420b may be substantially analogous to the first probe 420a of FIGS. 4A and 4B and include, for example: the second probe fixed end 421a, the second probe free end 422b, a structural body 424b, an interior surface 425b, an exterior surface 427b, a central hollow portion 426b, a main portion 430b, a main portion thickness 432b, a transition section 436b, a thinned region 440b, a window thickness 442b, a cap 450b, a seal chamber 452a, and a sensing feature 460b, a connection 462b; redundant explanation of which is omitted herein for clarity.

Figure 4E:
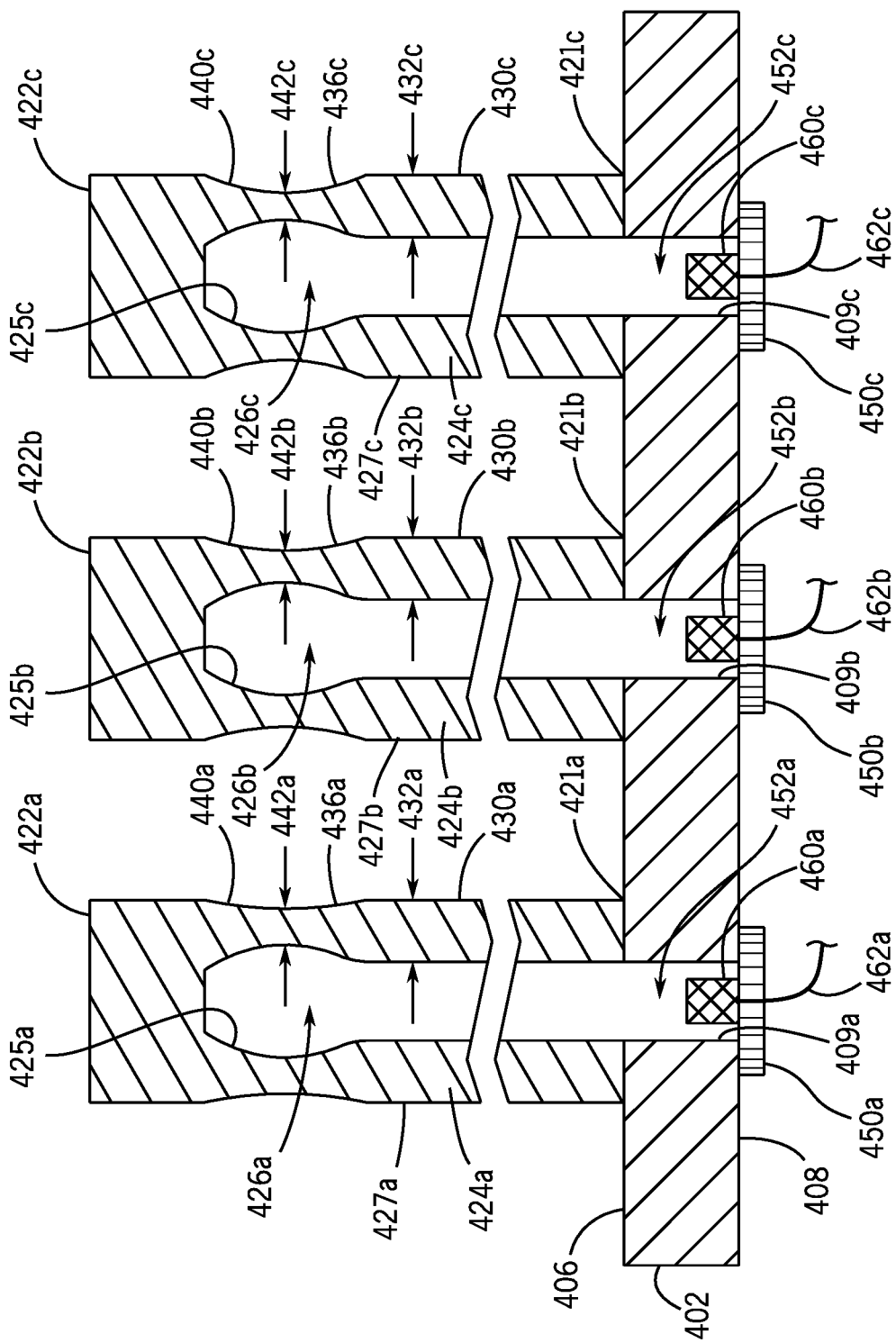
FIG. 4E depicts a cross-sectional view of the example corrosion monitoring device of FIG. 4A, taken along line 4E-4E of FIG. 4A.

Notwithstanding the foregoing similarities, the window thickness 442b may be less than the window thickness 442a, as further illustrated with reference to the cross-sectional view of FIG. 4E. Accordingly, the thinned region 440b may be configured to corrosively fail temporally prior to a corrosive failure of the thinned region 440a. In this regard, the device 400 may remain in-situ while the device 400 operates to measure corrosion over time.

FIG. 4D depicts a cross-sectional view of a third probe 420c of the example corrosion monitoring device 400 of FIG. 4A, taken along line 4D-4D of FIG. 4A. The third probe 420b may be substantially analogous to the first probe 420a of FIGS. 4A and 4B and include, for example: the third probe fixed end 421c, the third probe free end 422c, a structural body 424c, an interior surface 425c, an exterior surface 427c, a central hollow portion 426c, a main portion 430c, a main portion thickness 432c, a transition section 436c, a thinned region 440c, a window thickness 442c, a cap 450c, a seal chamber 452c, and a sensing feature 460c, a connection 462c; redundant explanation of which is omitted herein for clarity.

Notwithstanding the foregoing similarities, the window thickness 442c may be less than the window thickness 442a and the window thickness 442b, as further illustrated with reference to the cross-sectional view of FIG. 4E. Accordingly, the thinned region 440c may be configured to corrosively fail temporally prior to a corrosive failure of the thinned region 440a and the thinned region 440b. In this regard, the device 400 may remain in-situ while the device 400 operates to measure corrosion over time.

Figure 5:
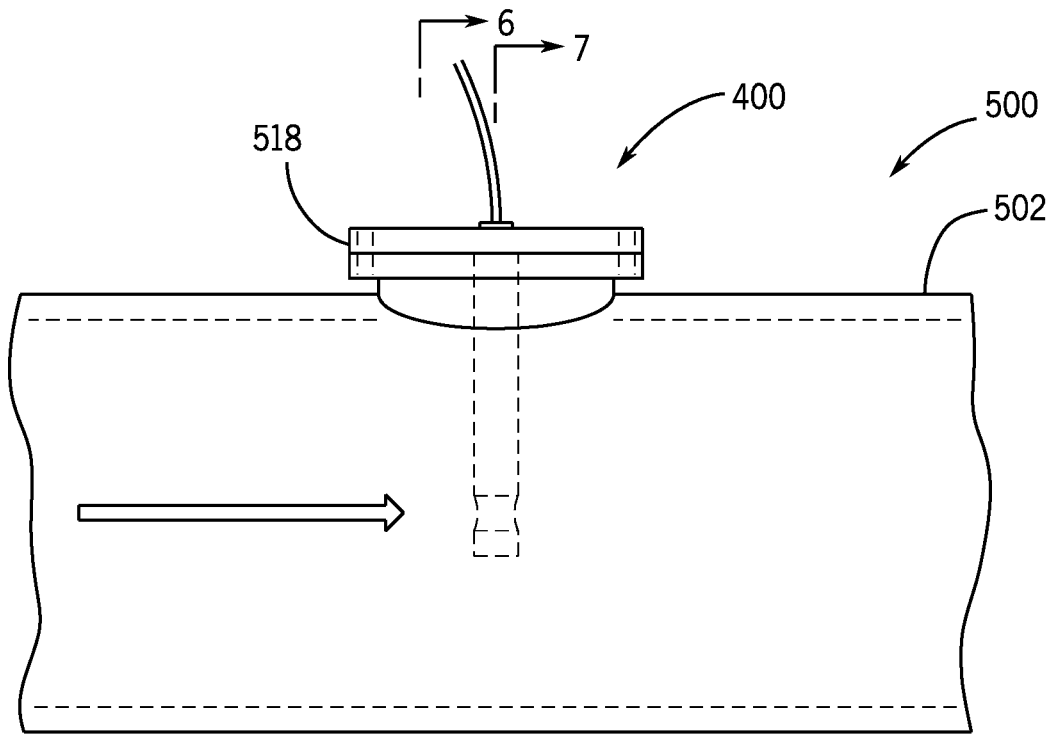
FIG. 5 depicts the example corrosion monitoring device of FIG. 4A associated with a process component of a molten salt reactor system.
Figure 6:
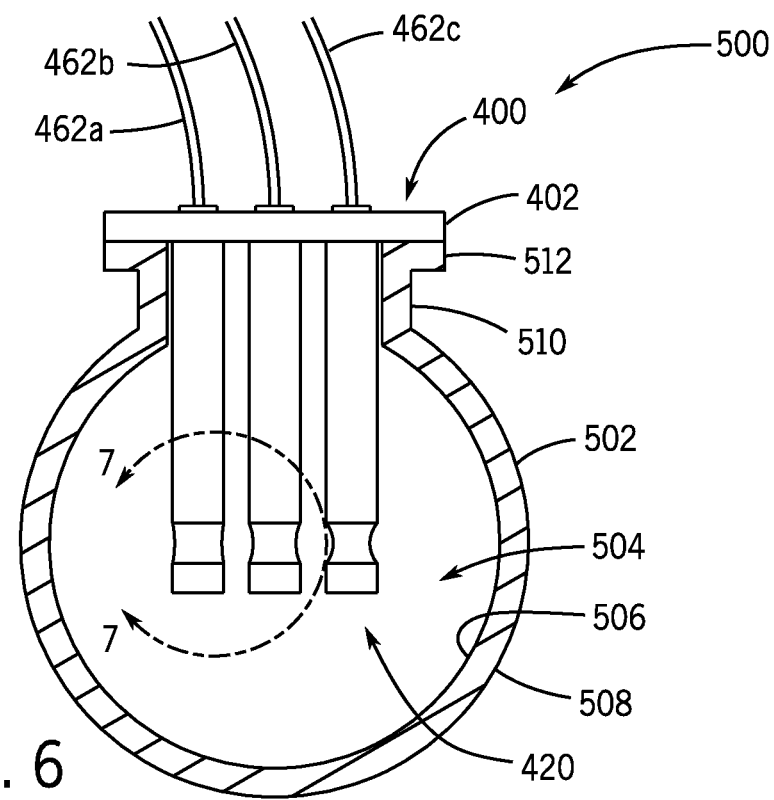
FIG. 6 depicts a cross-sectional view of the process component, including the associated example corrosion monitoring device of FIG. 5, taken along line 6-6 of FIG. 5.

The device 400 may be used in-situ in a process component 502 of a molten salt system, as illustrated in FIGS. 5 and 6. The process component 502 is illustrated in the example of FIGS. 5 and 6 as a pipe that defines an interior volume 504 with an interior surface 506 generally opposite the exterior surface 508. The process component 502 includes a neck feature 510 and mounting flange along one side of the pipe. It will be appreciated that the process component 502, and pipe configuration, is depicted for purposes of illustration. In other examples, the process component 502 may be a portion of a vessel, a tank, and/or other component of the molten salt system, such as any of the components depicted above in relation to the system 100 of FIG. 1.

The device 400 may be arranged in-situ with the molten salt system in part by removably mounting the device 400 with the process component 502. For example, and as shown in FIGS. 5 and 6, the device 400 is arranged with the plurality of probes 420 extending into the interior volume 504 such that the plurality of probes are submerged with and contacting a process fluid that flows through the process component 502. As shown in FIG. 6, the plurality of probes 420 may be arranged such each probe 402a, 420b, 420c faces a direction of fluid flow in the process component 502. In other examples, other arrangements are possible, such as orientating the plurality of probes approximately 90 degrees from the arrangement shown in FIG. 6. The device 400 may be further arranged with the mounting structure 402 attached to the mounting flange 512. For example, the mounting structure 402 and the mounting flange 512 may be complementary flange structures that may be removably attached to one another, such as via optional fasteners 518. In other cases, a clamp, a shoe, and/or other mechanism may be used to removably couple the device 400 and the process component 502.

Figure 7:
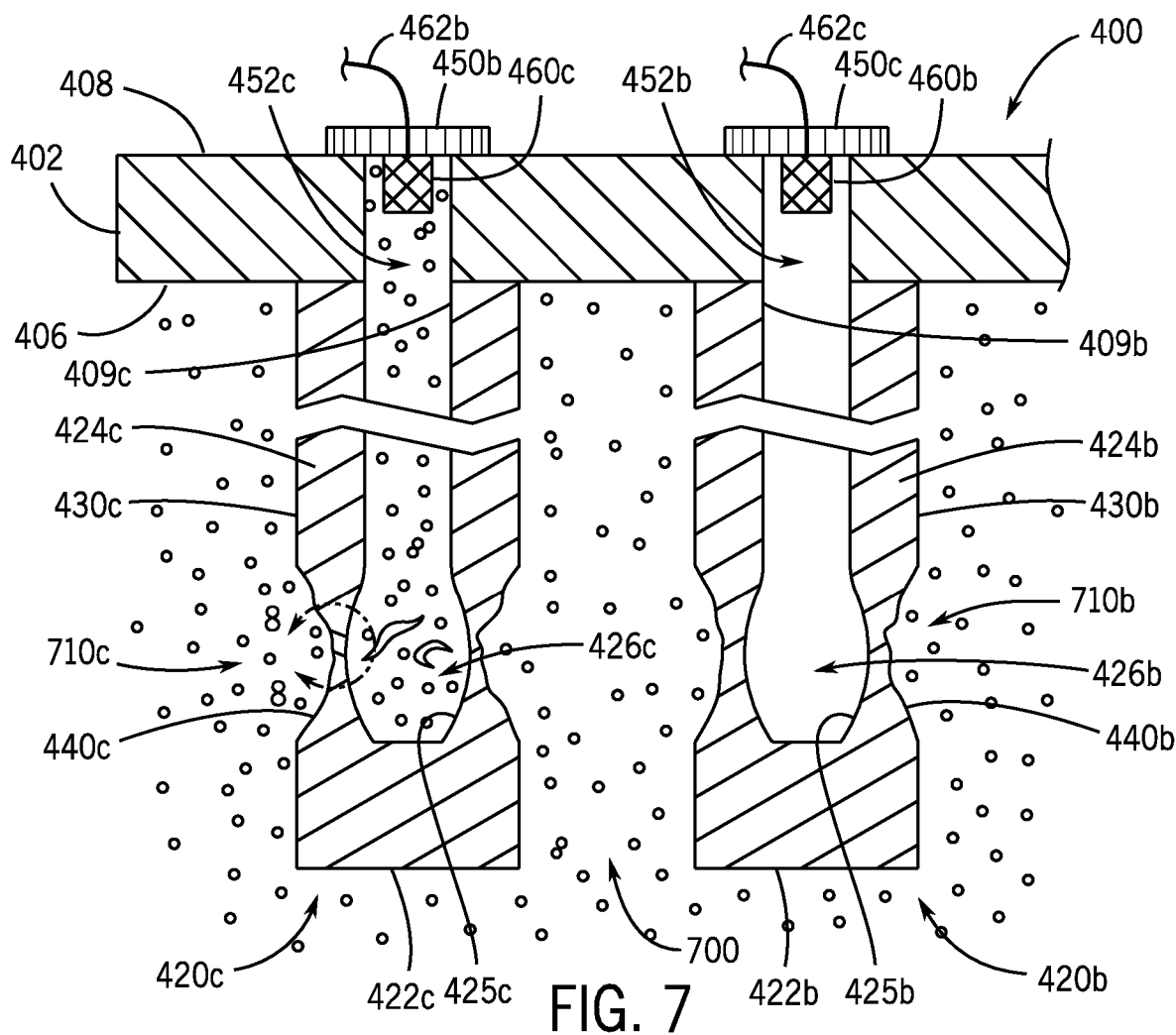
FIG. 7 depicts a cross-sectional view of the example cross-sectional view of the example corrosion monitoring device of FIG. 5, take along line 7-7 of FIG. 5.

In operation, and as depicted in the cross-sectional view of FIG. 7, the plurality of probes 420 may be exposed to a process fluid 700, such as any of the process fluids described herein. Over a period of time, the corrosive nature of the process fluid 700 may corrode the probes and contribute to the corrosive failure of the probes at a respective thinned region. As shown in FIG. 7, for example, the process fluid 700 may corrode the thinned region 440c of the third probe 420c such that third probe 420c develops a corrosive zone 710c at the thinned region 440c. Further, the process fluid 700 may corrode the thinned region 440b of the second probe 420b such that second probe develops a corrosive zone 710b at the thinned region 440b.

Figure 8:
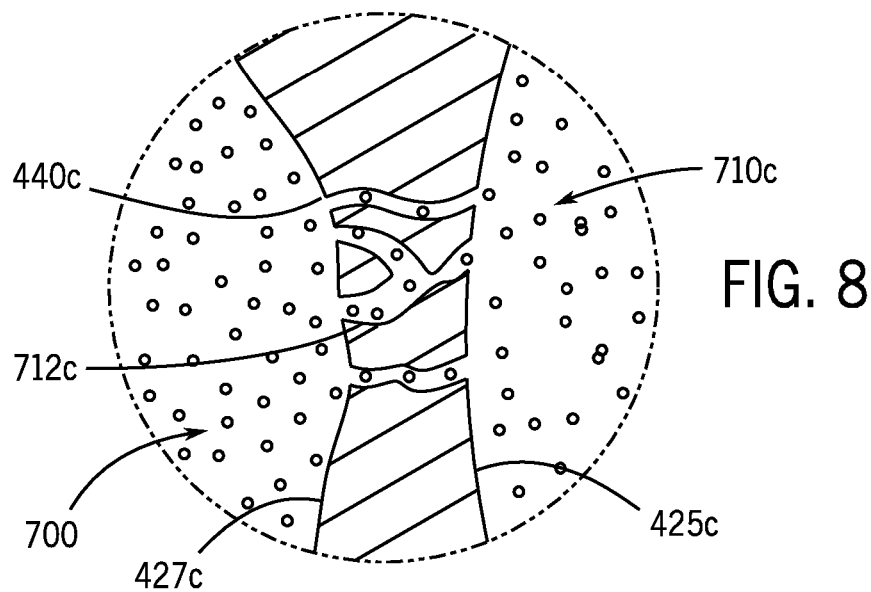
FIG. 8 depicts detail 8-8 of FIG. 7.

The window thickness 442c of the thinned region 440c is less than the window thickness 442b of the thinned region 440b. Accordingly, the thinned region 440c is configured, in this example, to corrosively fail prior to the thinned region 440b. For example, and as shown in FIG. 8, passages 712c may develop between the interior surface 425c and the exterior surface 427c of the probe 420c. These passages 712c may allow for the intrusion of some portion of the process fluid 700 to enter the sealed chamber 452c. Upon entry of the process fluid 700 into the sealed chamber 452c, the sealed chamber 452c may be breached. Upon such entry of the process fluid 700 into the sealed chamber 452c, the sensing feature 460c may detect a change in a capacitance, a change in temperature, and/or a change in pressure associated with the sealed chamber 452c. In turn, the sensing feature 460c may send a signal corresponding to this change to an external monitoring system, such as via connector 462c. As further shown in FIG. 7, the sealed chamber 452b of the second probe 420b is not yet breached. Accordingly, the device 400 may remain in-situ while the analyzing the information from the breach of the sealed chamber 452c and while waiting for a subsequent breach, such as at the sealed chamber 452b, in order to process additional information regarding the corrosive environment of the system without removing the device 400.

Figure 9:
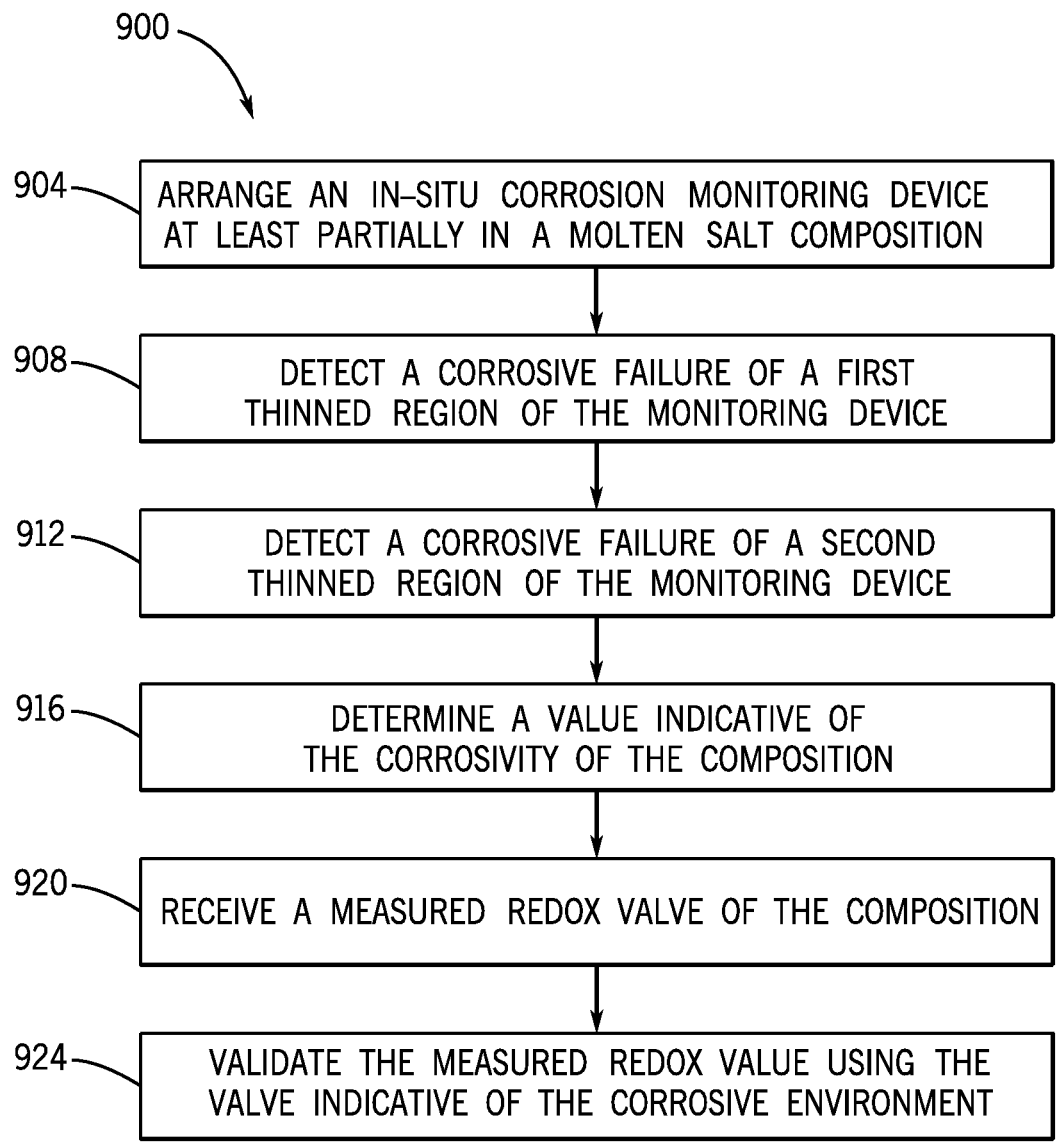
FIG. 9 depicts a flow diagram of an example method of in-situ corrosion monitoring.

FIG. 9 depicts a flow diagram of an example method of in-situ corrosion monitoring. At operation 904, an in-situ monitoring device is arranged at least partially within a molten salt composition. For example, and with reference to FIGS. 4A, 5, and 6, the device 400 is arranged at least partially within a molten salt composition that may flow through the process component 502. The mounting structure 402 may be coupled with the example mounting flange 512 of the process component 502 such that the plurality of probe 420 are arranged with a flow direction of, and generally submerged within, a process fluid flowing through the process component 502.

At operation 908, a corrosive failure of a first thinned region of the monitoring device is detected. For example, and with reference to FIGS. 7 and 8, a breach of the thinned region 440c of the probe 420c may be detected upon the instruction of the process fluid 700 into the sealed chamber 452c. The breach may be detected in part by using the sensing feature 460c to detect a capacitive, temperature, and/or change in pressure in the sealed chamber 452c that is caused by the instruction of the process fluid 700 into the sealed chamber 452c.

At operation 912, a corrosive failure of a second thinned region of the monitoring device is detected. For example, and with reference to FIGS. 7 and 8, a breach of the thinned region 440b of the probe 420b may be detected upon the instruction of the process fluid 700 into the sealed chamber 452b. The breach may be detected in part by using the sensing feature 460b to detect a capacitive, temperature, and/or change in pressure in the sealed chamber 452b that is caused by the instruction of the process fluid 700 into the sealed chamber 452b.

At operation 916, a value indicative of the corrosivity of the corrosive environment is determined, based on the detection of the corrosive failures. For example, and with reference to FIGS. 3 and 7, the external monitoring module 340 may determine one or more values indicative of the corrosive environment of the process fluid 700 using the predetermine material thickness of the thinned region and the time or duration of the corrosive failure. In turn, at operation 920, a measured redox value associated with a corrosive environment may be received from a redox measurement system of the molten salt reactor system. For example, the redox measurement system module 350 may measure a redox potential of the fluid 700, as described herein. The redox measurement system module 350 may use an electrode-based system to predict a redox value. This measurement may be transmitted to the external monitoring module 340 such that, at operation 924, the measured redox value may be validated by correlating the value indicative of the corrosivity of the corrosive environment with the measured redox value.

Figure 10:
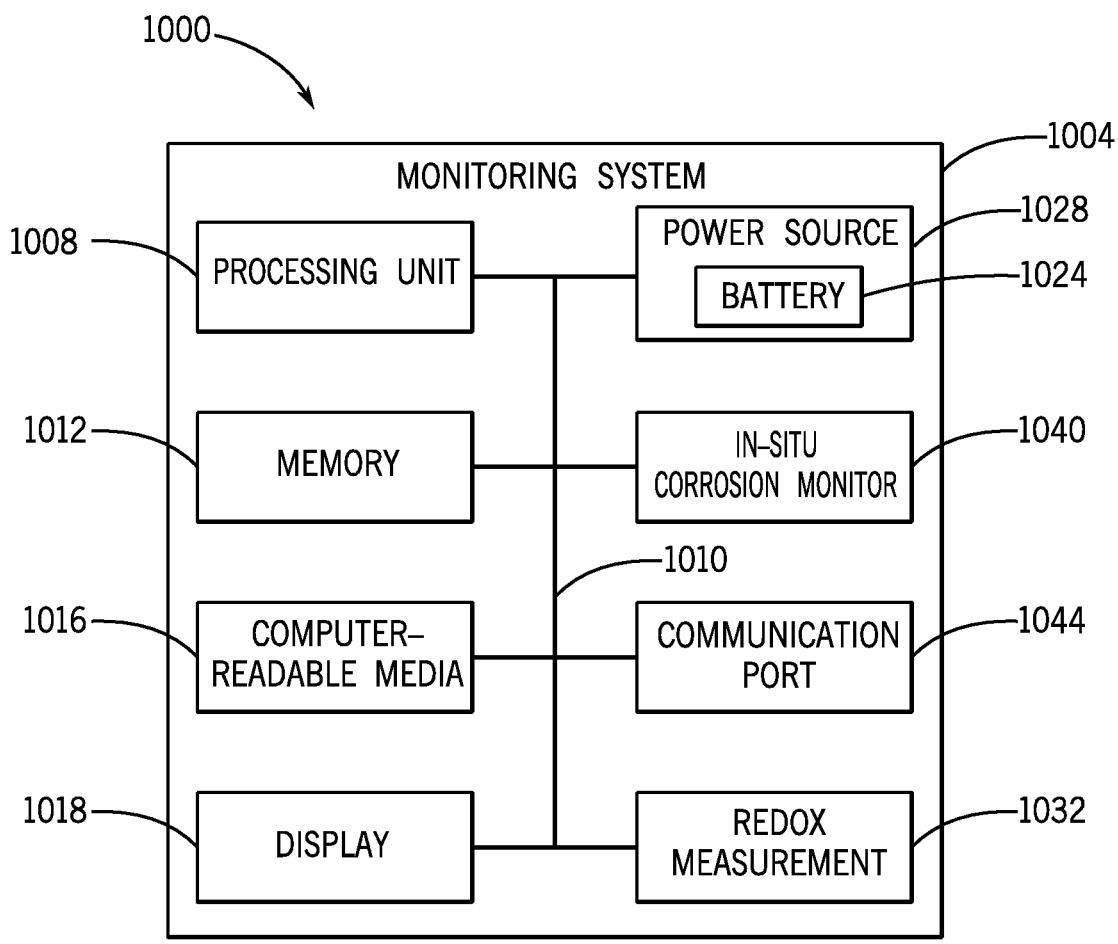
FIG. 10 depicts an example functional block diagram of a device for in-situ corrosion monitoring.

FIG. 10 presents an illustrative monitoring system 1000. The schematic representation in FIG. 10 may be substantially analogous to the system 300 and 300' described above with respect to FIGS. 3A and 3B. However, FIG. 10 may also more generally represent other types of devices and configurations that may be used to receive a user input signal from an input device in accordance with the examples described herein. In this regard, the monitoring system 1000 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 10, the monitoring system 1000 may include a processing unit or element 1008 that is operatively connected to computer memory 1012 and computer-readable media 1016. The processing unit 1008 may be operatively connected to the memory 1012 and computer-readable media 1016 components via an electronic bus or bridge (e.g., such as system bus 1010). The processing unit 1008 may include one or more computer processors or microcontrollers that are configured to perform operations in response to computer-readable instructions. The processing element 1008 may be a central processing unit of the monitoring system 1000.

The memory 1012 may include a variety of types of non-transitory computer-readable storage media, including, for example, read access memory (RAM), read-only memory (ROM), erasable programmable memory (e.g., EPROM and EEPROM), or flash memory. The memory 1012 is configured to store computer-readable instructions, sensor values, and other persistent software elements. Computer-readable media 1016 may also include a variety of types of non-transitory computer-readable storage media including, for example, a hard-drive storage device, a solid state storage device, a portable magnetic storage device, or other similar device. The computer-readable media 1016 may also be configured to store computer-readable instructions, sensor values, and other persistent software elements.

In this example, the processing unit 1008 is operable to read computer-readable instructions stored on the memory 1012 and/or computer-readable media 1016. The computer-readable instructions may adapt the processing unit 1008 to perform the operations or functions described above with respect to FIGS. 1-9. The computer-readable instructions may be provided as a computer-program product, software application, or the like.

As shown in FIG. 10, the monitoring system 1000 may also include a display 1010. The display 1018 may include a liquid-crystal display (LCD), organic light emitting diode (OLED) display, light emitting diode (LED) display, or the like. If the display 1018 is an LCD, the display may also include a backlight component that can be controlled to provide variable levels of display brightness. If the display 1018 is an OLED or LED type display, the brightness of the display 1018 may be controlled by modifying the electrical signals that are provided to display elements. The monitoring system 1000 may also optionally include a battery 1024 that is configured to provide electrical power to the components of the monitoring system 1000.

The monitoring system 1000 may also include an in-situ corrosion monitor 1040. The in-situ corrosion monitor 1040 may be substantially analogous to any of the in-situ corrosion monitors described herein, such as the monitors 310, 310' or 400 described above with respect to FIGS. 3A, 3B and 4A. The monitoring system 1000 may also include a redox measurement system 1032. The redox measurement system 1032 may be substantially analogous to any of the redox measurement systems described herein, such as the redox measurement systems 350, 350' described above with respect to FIGS. 3A and 3B. The monitoring system 1000 may also include a communication port 1044 that is configured to transmit and/or receive signals or electrical communication from an external or separate device. The communication port 1044 may be configured to couple to an external device via a cable, adaptor, or other type of electrical connector. In some embodiments, the communication port 1044 may be used to couple the monitoring system 1000 with a computing device and/or other appropriate accessories configured to send and/or receive electrical signals.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A device for in-situ corrosion monitoring in a molten salt reactor system, the device comprising
   a mounting structure;
   a plurality of probes, each probe of the plurality of probes having a main portion and a thinned region that together define a sealed chamber with the mounting structure, wherein each thinned region of the plurality of probes is configured to corrosively fail, when exposed to a corrosive environment, both: (i) before any main portion of the plurality of probes, and (ii) temporarily in series with the other thinned portions of the plurality of probes; and a plurality of sensing features corresponding to the plurality of probes, each sensing feature disposed in a respective sealed chamber of the plurality of probes;

wherein each sensing feature is configured to detect a breach of the respective sealed chamber caused by the corrosive failure of the thinned region.

2. The device of claim 1, wherein at least one probe of the plurality of probes comprises a structural body, and the main portion and the thinned region are integrally formed structures of the structural body.

3. The device of claim 2, wherein the structural body defines a central hollow portion therein that establishes a volume of a sealed chamber of the at least one probe, and the thinned region defines a thinnest point of separation between the central hollow portion and an external environment of the at least one probe.

4. The device of claim 3, wherein the structural body has a predetermined window thickness at the thinnest point of separation that is configured to cause the thinned region to corrosively fail after a first time period when exposed to the corrosive environment.

5. The device of claim 4, wherein the volume of the sealed chamber of the at least one probe is filled with an inert gas;

in response to a breach of the sealed chamber, fluids and gases external to the at least one sensor probe enters the central hollow portion; and a sensing feature of the at least one probe is configured to detect a presence of the fluids or gases in the central hollow portion.

6. The device of claim 5, wherein the device further comprises a processing unit communicatively coupled with the sensing feature and configured to determine, based on the detection of the presence of the fluids or gases in the central hollow portion, a time of the breach, determine, based on the time of breach and an indication of a starting time of the at least one probe in the corrosive environment, a duration of the at least one probe in the corrosive environment, and determine, based on the duration of the at least one probe in the corrosive environment and the predetermined window thickness, a value indicative of the corrosivity of the corrosive environment.

7. The device of claim 6, wherein the processing unit is further configured to receive, from a redox measurement system of the molten salt reactor system, a measured redox value associated with the corrosive environment; and validate the measured redox value by correlating the value indicative of the corrosivity of the corrosive environment with the measured redox value.

8. The device of claim 2, wherein the thinned region has a width that is around three orders of magnitude less than a width of the main portion.

9. The device of claim 8, wherein the width of the thinned region is between 10 to 20 micrometers.

10. The device of claim 2, wherein the structural body is an elongated tubular structure, and the thinned region is defined about a complete circumference of the elongated tubular body.

11. The device of claim 1, wherein at least one sensing features comprises an electrode configured to trigger an electrical response when exposed to a change in the composition, temperature, or pressure of the respective sealed chamber.

12. The device of claim 11, wherein the electrode is an electrode of a captative-based sensing system.

13. The device of claim 1, wherein the mounting structure comprises a flange configured to removably couple the device to a processes barrier of the molten salt reactor system.

* * * * *